Patented Apr. 2, 1929.

1,707,257

UNITED STATES PATENT OFFICE.

CHARLES DE ROHDEN, OF BALTIMORE, MARYLAND, ASSIGNOR TO COMMERCIAL PIGMENTS CORPORATION, OF NEW YORK, N. Y., A CORPORATION OF DELAWARE.

PRODUCTION OF TITANIUM TETRACHLORIDE.

No Drawing.  Application filed February 8, 1928. Serial No. 252,946.

My invention pertains to the production of titanium tetrachloride and relates more specifically to an improvement in the process of producing this substance by treating a mixture of titanic material and carbon with chlorine at an elevated temperature. Over one hundred years ago, J. B. A. Dumas discovered that titanium tetrachloride could be prepared by submitting a mixture of titanic oxide and carbon maintained at red heat to the action of chlorine. Since the work of Dumas, various later workers have suggested modifications by means of which the process has been improved and the yields of material obtained have been increased. Nevertheless, past attempts to operate the process on an economical basis have failed, for while very good results have been obtained in the laboratory, the transfer of the process to a large industrial scale has been prevented by difficulties of operation which the present invention is designed to overcome.

One of the principal difficulties encountered in attempts to operate the process on an industrial scale has been the difficulty of securing a correct admixture of titanic material and carbon. The literature has shown that a suitable mixture for laboratory use may be prepared from powdered $TiO_2$ and lampblack. However, such a fine, dusty material is unsuited for industrial treatment, and the practical difficulties in chlorinating this material in a large apparatus at any reasonable rate of speed have been thus far insuperable. The treatment of a mixture of lumps of carbon and $TiO_2$ can be carried out on a large scale in simple apparatus with relative ease, since the chlorine will penetrate easily between the lumps, but in such a process the rate of reaction is very low, the chlorine is inefficiently used, and the process is hence quite expensive.

In his U. S. Patent 1,179,394, Barton has proposed still a different method of securing a proper mixture of titanic material and carbon that can be efficiently chlorinated. He mixes a powdered titaniferous material such as rutile with a coking coal and by heat treatment in the absence of air he produces a titanic cinder. This cinder, owing to its porous, tough, granular structure and its intimate admixture of titaniferous material and carbon, may be easily chlorinated.

My improved process for producing titanium tetrachloride relates in part to a simpler and more economical method of producing the requisite intimate admixture of titanic material and carbon in the form of a tough, porous, non-crumbling, granular raw material which can be easily treated on an industrial scale and which offers no obstruction to the passage of chlorine gas, even when maintained at a high temperature and in a large mass such as might be used in a chlorinating tower. Briefly, this aspect of my invention relates to the use of titanic material itself as a binder in the requisite mixture with carbon. By means of my invention a suitable mass for treatment may be prepared by the simple admixture of the substances with an aqueous solution, and the subsequent evaporation of the water therefrom, whereby a mass suitable for treatment is produced in the simplest possible fashion, without the necessity of high temperature treatment, elaborate apparatus or the like.

Another object of my invention is to provide a means for the production of pure titanium tetrachloride uncontaminated by iron. This may be accomplished by the use of industrially pure titanium dioxide as a source of raw material. On the other hand, my process is equally adaptable to the treatment of other less pure titaniferous materials such as rutile or ilmenite.

In preparing a suitable granular, porous, non-crumbling mass containing titaniferous material and carbon, I make use of the peculiar colloidal properties of titanium dioxide. By a suitable process hereinafter described, it is possible to peptize relatively pure precipitated $TiO_2$ to form an aqueous colloidal suspension (peptized solution) containing as much as 550 grams of $TiO_2$ per liter. Such a solution is as fluid as water, is unfiltrable, and behaves as a binder or mineral glue. When particles of solid substances, such for example as carbon and ore, are mixed with this peptized solution and the entire mixture dried, a tough, granular mass results. After being broken into fragments it is quite suitable for treatment with chlorine at an elevated temperature to produce titanium tetrachloride.

For the production of titanium tetrachloride for ordinary industrial purposes, granular masses prepared by mixing carbon and titanium ore cemented together with about 20% (dry weight) of peptized $TiO_2$ are suitable for chlorination. Such a mass may be conveniently prepared by mixing 20–25 parts of finely ground carbon such as coke or charcoal with 60–50 parts of powdered ore, after which 20 parts (dry weight) of $TiO_2$ in the form of a peptized solution is added to serve as a binder. If it is desired to produce pure titanium tetrachloride the titanium ore may be wholly replaced by pure $TiO_2$. For example, 20–25 parts of carbon may be mixed with 80–75 parts of colloidal $TiO_2$ in the form of a peptized solution or, alternatively, part of the petized $TiO_2$ may be replaced by coagulated (precipitated) $TiO_2$.

In any event, the moist mass thus obtained may be spread out on a suitable surface and allowed to dry, after which it may be broken up into suitable fragments for the chlorination treatment. Alternatively, the moist mass may be put through a briquetting machine to produce suitable small pellets of material, which may then be dried.

The peptized solution used as a binder may be easily prepared from ordinary titanium dioxide precipitated by hydrolysis of the sulfate solution in the well-known manner. Prior to peptization, the $TiO_2$ must first be treated to remove adsorbed sulfuric acid, since the presence of polybasic acid prevents peptization. The sulfuric acid may be removed by washing the precipitate with an alkaline solution such as aqua-ammonia or sodium carbonate solution. The peptized solution may then be prepared from the washed $TiO_2$ precipitate as follows:

To 1 kilogram of $TiO_2$ in the form of a wet filter-cake containing about 60% of water, there is added 150 grams of concentrated hydrochloric acid, which substance is incorporated with the cake by ordinary mixing processes. The mass becomes completely fluid as soon as the hydrochloric acid is added since the latter material converts the $TiO_2$ to the colloidal form, producing a peptized solution. It is not necessary to use concentrated hydrochloric acid for this purpose, and in its place an equivalent quantity of dilute acid may be employed. In any event, the acid is diluted as soon as peptization occurs, on account of the presence of a large amount of water in the filter-cake. In place of hydrochloric acid, another monobasic acid such as nitric acid or hydrobromic acid may be used.

Instead of first removing the adsorbed sulfuric acid from the filter-cake, and then peptizing the latter with hydrochloric acid, I may prefer to combine these two processes. For example, I may take the filer-cake containing adsorbed sulfulric acid and mix with it sufficient barium chloride to react with all of the sulfuric acid to produce insoluble barium sulfate. The hydrochloric acid generated as a by-product of this reaction will cause the peptization of the $TiO_2$. In place of barium chloride, I may use any other chloride salt, the metallic element of which forms an insoluble sulfate.

To produce titanium tetrachloride, I then subject the granular masses or briquettes previously mentioned to the action of chlorine gas at an elevated temperature. The chlorination may be conveniently conducted by placing the granular mass in an ordinary quartz tube, to which heat may be applied. There is no critical temperature for chlorination and good results are obtained so long as the mass is held within a temperature range of 650 to 800° C. If the material treated comprises only dried peptized $TiO_2$ and finely ground carbon, the chlorination may be satisfactorily conducted at a temperature as low as 500° C. The rate at which the chlorine gas is added will, of course, depend entirely on the cross-sectional area of the chlorination apparatus. The gases evolved from the chlorination apparatus are cooled and titanium tetrachloride is thus recovered as a liquid. The residual chlorine gas may be recovered and used in the process.

The purity of the titanium tetrachloride produced will depend entirely on the nature of the titaniferous material used. If pure titanium dioxide is used, the tetrachloride produced will be quite pure. If rutile or ilmenite are used, some ferric chloride will also be produced and will be condensed with the titanium tetrachloride. The latter substance forms at a lower temperature, however, and for that reason it is advantageous to conduct the chlorination reaction at the lowest possible temperature. By doing this, one is able to produce a "first fraction" of practically pure titanium chloride, and all of the iron chloride produced as an impurity will be found in the latter part of the titanium tetrachloride produced by the reaction.

It is not necessary to continue the chlorination until all of the raw material is consumed and, in fact, that is impracticable since the granular structure of the mass would be destroyed and the chlorination process would be rendered difficult toward the end. The residual mass left after chlorination may be incorporated with fresh carbon, titaniferous material and peptized solution and used over again. In the case of very crude titaniferous materials, however, such as ores that contain large quantities of silica and other impurities, it is sometimes preferable to discard the chlorination residue rather than to incorporate it in a new mixture.

Titanium tetrachloride, when pure, is a transparent, colorless liquid boiling at about 137° C. It solidifies at 23° C. The purity of the product obtained by my process depends on the purity of the titaniferous material used. It may be purified from residual chlorine by refluxing in an atmosphere of nitrogen. Ferric chloride may be removed by fractional distillation and the fraction boiling at 136–7° C. may be further purified by shaking with mercury and sodium amalgam.

Now, having described my invention, I claim:

1. A process for the production of titanium tetrachloride which comprises mixing together carbon, a titaniferous substance, and a colloidal suspension of titanium dioxide, drying said mixture to produce a tough mass, and subjecting fragments of said mass to the action of chlorine.

2. A process for the production of titanium tetrachloride which comprises mixing together carbon, titanium dioxide, and a colloidal suspension of titanium dioxide, drying said mixture to produce a tough mass, and subjecting fragments of said mass to the action of chlorine.

3. A process for the production of titanium tetrachloride which comprises mixing together carbon and a colloidal suspension of titanium dioxide, drying said mixture to produce a tough mass, and subjecting fragments of said mass to the action of chlorine.

4. As a new composition of matter, a mixture of carbon and a titaniferous substance cemented together by dry peptized $TiO_2$.

5. As a new composition of matter, a mixture of carbon and titanium dioxide cemented together by dry peptized $TiO_2$.

6. As a new composition of matter, a tough mass comprising carbon and dry peptized $TiO_2$.

CHARLES DE ROHDEN.